Dec. 17, 1963  L. B. SIMON  3,114,354
CHAMBER ORBITING ROTARY INTERNAL COMBUSTION ENGINE
Filed March 28, 1961  2 Sheets-Sheet 1
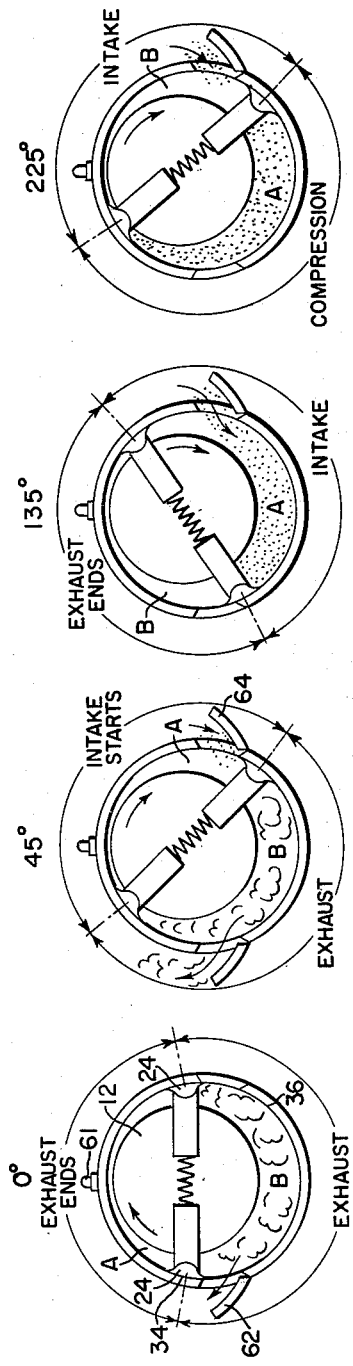
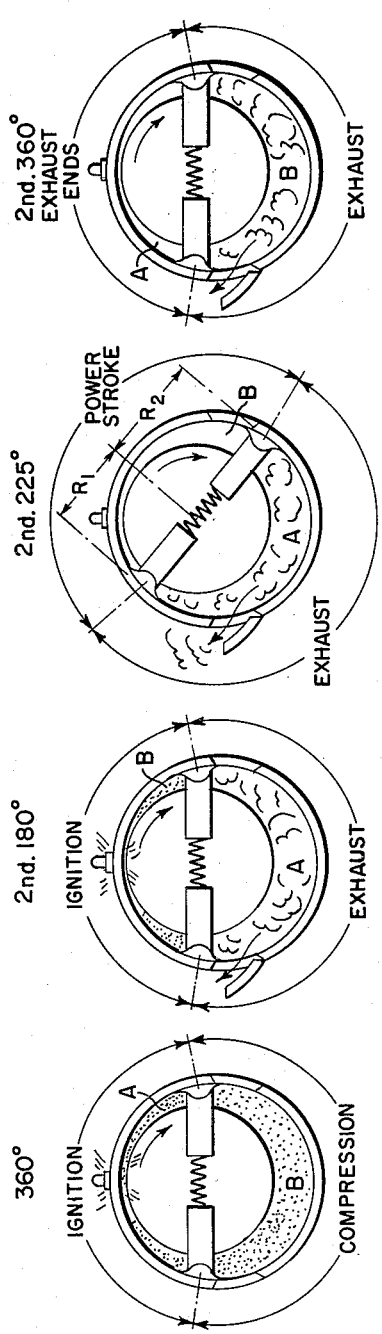
INVENTOR.
LEWIS B. SIMON
BY
ATTORNEYS Dec. 17, 1963
L. B. SIMON
3,114,354
CHAMBER ORBITING ROTARY INTERNAL COMBUSTION ENGINE
Filed March 28, 1961
2 Sheets-Sheet 2
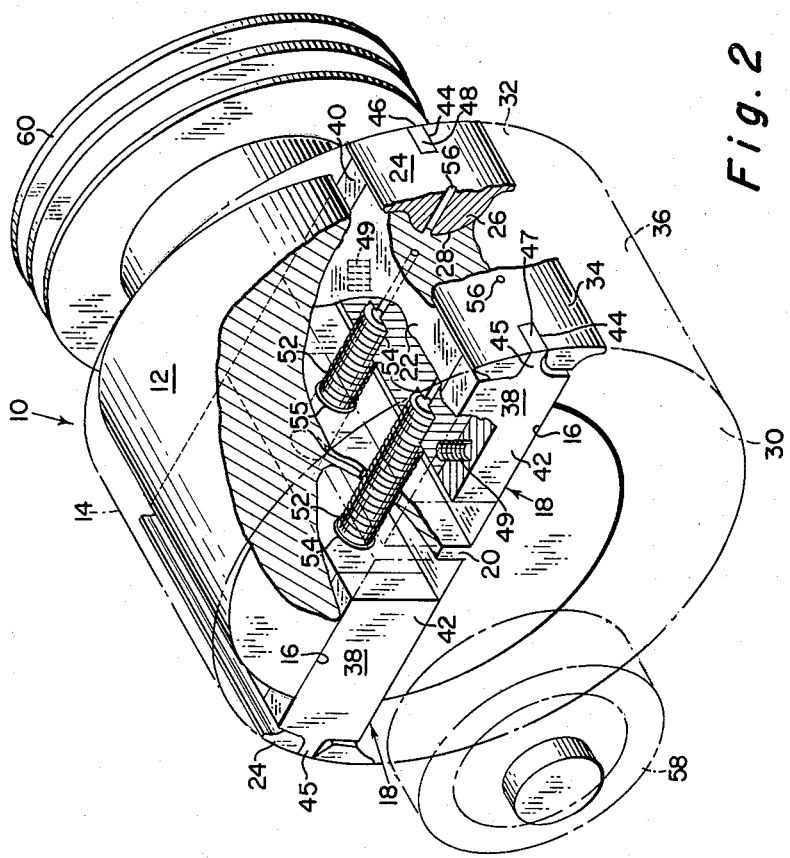
Fig.2
Fig.3
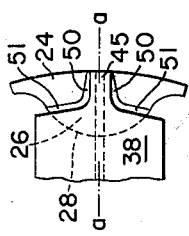
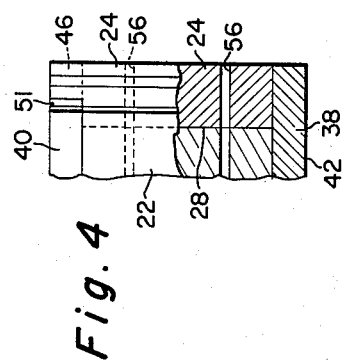
Fig.4
INVENTOR.
LEWIS B. SIMON
BY
ATTORNEYS

United States Patent Office 3,114,354
Patented Dec. 17, 1963

3,114,354
CHAMBER ORBITING ROTARY INTERNAL
COMBUSTION ENGINE
Lewis B. Simon, 524 E. Olive St., Oxnard, Calif.
Filed Mar. 28, 1961, Ser. No. 98,992
6 Claims. (Cl. 123—16)
(Granted under Title 35, U.S. Code (1952), sec. 266)

The invention described herein may be manufactured and used by or for the Government of the United States of America for governmental purposes without payment of any royalties thereon or therefor.

The present invention relates to a rotary internal combustion engine of the type having a rotor eccentrically mounted with respect to a casing and more particularly to such an engine having a novel sealing arrangement between its rotating chambers.

One of the most critical problems confronting designers of rotary engines having a rotor eccentrically mounted with respect to a casing has been to provide an adequate seal between the engine's rotating chambers. This problem has been troublesome because the angle of intersection of any radial from the axis of the eccentric rotor with the interior surface of the casing varies upon the rotation of the rotor. Accordingly, presently existing vanes which are slidingly and radially mounted within the rotor will only make line contact at their outer ends with the inner surface of the casing, which contact is not sufficient engagement to provide an adequate seal between the rotating chambers. An attempt has been made to overcome this problem by inserting laminated strips within each vane which will individually slide with respect to the vane and each other strip to contact the inner surface of the casing, thus providing a seal between the individual laminations. Here again, however, merely a line contact is made by each individual lamination with the casing and the machining required to ensure that the laminations slide with respect to one another is so critical that this arrangement has little reliability. Also a seal has been attempted by employing a resilient member mounted at the outer end of the vane which will flex to conform to the shape of the inner surface of the casing as the rotor rotates therein. This approach to the problem imposes great limitations on the design of the eccentricity of the rotor due to the limitations of the flexure of the member and an effective seal is difficult to maintain since a firm engagement will occur only over a small portion of this member. Further, the member will lose its flexing qualities over a period of time. The present invention overcomes these problems by providing a sealing shoe which is mounted at the outer end of each vane on the rotor so that upon rotation of the rotor the shoe rocks with respect to the vane thus providing complete engagement between the sealing shoe's outer surface and the inner surface of the casing at all times. A further problem encountered in the prior art in using laminations and the flexible member for sealing purposes has been to provide an adequate seal at the junction of the lamination or the flexible member and the sides of each vane. The laminations in their movement with respect to one another and the flexure of the member adjacent the junction tend to open a chamber on each side of the vane to one another. The present invention overcomes this problem by providing a side plate on each side of the vane, the side plate having an outer end which slidingly engages the inner surface of the casing along with the sliding shoe.

An object of the present invention is to provide a more efficient seal between chambers of a rotary device.

Another object is to provide a more efficient rotary internal combustion engine wherein the engine is of the type having a rotor eccentrically mounted within a casing.

A further object is to provide an improved seal between the vanes of a rotary engine.

Still another object is to provide a rotary engine wherein the vanes maintain complete engagement with a portion of an inner surface of the engine's chamber while the rotor rotates within the chamber.

A still further object is to provide a vane for a rotary engine which will maintain an improved seal with inner surfaces of the engine's casing.

A still further object is to provide a device which will substantially prevent any leakage from one chamber into another chamber of a rotary type internal combustion engine.

Other objects and many of the attendant advantages of this invention will be readily appreciated when the same become better understood by reference to the following detailed description when considered in connection with the accompanying drawings wherein:

FIGS. 1a through 1h show the cyclic operation of the rotary engine.

FIG. 2 is an isometric view of the rotary engine with the interior of its casing shown in phantom and with a portion of the rotor cut away.

FIG. 3 is a side view of a portion of the vane.

FIG. 4 is a top view of FIG. 3 partially cut away along line a—a.

Referring now to the drawings wherein like reference numerals designate like or corresponding parts throughout the several views, there is shown in FIG. 2 a rotary internal combustion engine 10 having a rotor 12 eccentrically mounted within a casing 14, the interior surfaces of the casing being shown in phantom in the figure. Slidably mounted within radial slots 16 of the rotor are two vanes 18, these vanes being identical in their construction. The radial slots 16 diametrically oppose one another and extend from both sides of the rotor to a web 20, this web preferably being integral with the remainder of the rotor. For simplification, the construction of the vane on the right side of FIG. 2 is now referred to wherein that vane includes a base portion 22 slidably mounted within the slot 16 of the rotor. A sealing shoe 24 is rockably mounted at an outer end of the base portion 22 such as by a ball and socket joint, the shoe 24 having the ball 26 and the outer end of the base portion having the socket 28. The sealing shoe 24 extends from a forward wall 30 of the casing to an after wall 32 of the casing and has an outer cylindrical face 34 which is shaped to conform to an inner cylindrical wall 36 of the casing. Slidably engaging opposing sides of the base portion 22 is a forward side plate 38 and an after side plate 40. The forward side plate 38 has an outer surface 42 which slidably engages the forward wall 30 of the rotary engine casing and the after side plate 40 has a similar surface which slidably engages the after wall 32 of the rotary engine casing. The sealing shoe 24 has openings 44 at its ends for receiving a tab 45 of the side plate 38 and a tab 46 of the side plate 40 these tabs having outer end surfaces 47 and 48 which extend to the inner cylindrical wall 36 of the casing so as to be slidable thereon. Each of the side plates 38 and 40 are biased in an outward diagonal direction by compression springs 49. The side plates 38 and 40 are movable in two directions, namely, radially and axially with respect to the axis of the rotor 12. As shown in FIG. 3 the sealing shoe 24 and the tabs 45 and 46 are beveled with respect to each other to provide spaces 50, and the tabs are extended to provide spaces 51, all of these spaces permitting rocking movement of the sealing shoe with respect to the base portion 22. The vanes 18 are urged in a radially outward direction with respect to the axis of the rotor by compression springs 52, these springs being inserted within recesses 54 of the base portion 22 of each vane and through the openings 55 within the web 20.

Each vane has a plurality of oil passages which lead from the recesses 54 through the ball 26 of the sealing shoe and open on the outer cylindrical face 34, the oil being supplied to the oil passages through the recesses. At the forward end of the motor is shown a timing gear 58 and at the after end of the motor is shown a spiral cooling fin 60.

In the operation of the device reference is made to FIGS. 1a through 1h wherein the rotor is shown in various positions throughout two complete revolutions, the engine having a spark plug 61. In FIG. 1a, chamber A has completed its exhaust and chamber B is now beginning its exhaust through an exhaust valve 62. In FIG. 1b, the rotor has rotated 45° in a clockwise direction and chamber A is beginning its intake of combustible gas through an intake valve 64 with chamber B still in its exhaust. After 135° of revolution chamber B has completed its exhaust and chamber A is still in its intake stage. In FIG. 1d, after 225° of revolution chamber A commences its compression stage and chamber B commences an intake stage. In FIG. 1e, after a complete revolution chamber A is ignited and chamber B commences a compression stage. In FIG. 1f, the rotor has rotated 180° in the second revolution and chamber A is commencing an exhaust stage and chamber B is being ignited. In FIG. 1g, after 225° in the second revolution chamber A is exhausting and chamber B is delivering its power stroke. In FIG. 1h, after two complete revolutions chambers A and B are performing the same functions as shown in FIG. 1a. The torque acting upon the rotor after ignition can readily be seen in FIG. 1g. This torque is equal to $$(R_2 - R_1) L_A \times P\left(\frac{R_2 - R_1}{2} + R_1\right)$$

where $R_1$ equals the radius from the axis of the rotor to the outer extremity of one vane and $R_2$ is equal to the radius of the axis of the rotor to the outer extremity of the other vane, $L_A$ is equal to the axial length of the rotor and P is equal to the differential in pressure due to the ignition of the combustible gas. In each of the FIGS. 1a through 1h it is readily apparent that the sealing shoes 24 rock with respect to the remainder of each vane so as to provide complete and entire engagement between the outer cylindrical face 34 of each shoe and the inner cylindrical wall 36 of the casing. By providing a complete engagement at all times between the outer cylindrical face of the sealing shoe and the inner cylindrical wall of the casing an improved seal is maintained between the chambers A and B. While the compression springs 52 are employed to radially urge the vanes in an outward direction it is readily apparent that the vanes would seal against the casing without the springs since they would be forced outwardly by centrifugal force.

During the operation of the engine the outer surfaces 42 of the side plates 38 and the outer surfaces of the side plates 40 slidingly engage the forward wall 30 and the after wall 32 of the casing respectively and the outer end surfaces 47 and 48 of the tabs 45 and 46 slidingly engage the inner cylindrical wall 36 of the casing. By extending the tabs of the side plates all the way to the inner cylindrical wall 36 of the casing an improved seal is maintained along the forward wall 30 and the after wall 32. Wear caused at the outer surfaces 42 of the side plates 38, the outer surfaces of the side plates 40 and the end surfaces 47 and 48 of the tabs due to the sliding action thereon is taken up by the action of the compression springs 49 thus ensuring a perpetual seal. By limiting the number of vanes on the rotor 12 to two, one opposing the other, a more efficient intake of the combustible gases and a more efficient exhaust of the burned gases is attained. This is readily apparent by reference to FIG. 1a through 1h where it is shown that the intake stage and the exhaust stage are both over 180° rotation of the rotor. Thus the inertia of the combustible gas and the burned gas is more efficiently utilized by the lengthy intake and exhaust angles of the rotor thereby providing an improved combustible gas mixture and an improved exhausting of the burned gases.

Further improved efficiency of the engine is attained by having each compression spring 52 urging both of the vanes. By this arrangement these springs will accurately establish a constant sealing pressure during the starting phase of the engine thus allowing an accurate design of this pressure and preventing unnecessary wear on the sealing shoe. Further, since the springs 52 will be exerting a substantially constant pressure at all times during operation of the engine their life will be for an indefinite period of time.

It is now readily apparent that the present invention provides a more efficient rotary motor in numerous ways. First, by employing a rockable sealing shoe 24 at the outer end of each vane an improved seal is maintained between the vanes by the complete engagement of the sealing shoe with the inner surface of the casing at all times. By employing side plates 38 and 40 with tabs a seal is maintained against the forward and after walls of the casing of the engine all the way to the inner cylindrical surface of the casing. By mounting the side plates for movement against their sliding surfaces and by providing the diagonal springs 48, wear caused at these surfaces is taken up so as to maintain a good seal during the life of the engine. By limiting the number of vanes to two the intake and exhaust phases of the engine become more efficient and by having each spring 52 acting on both vanes the sealing pressure of the sealing shoe on the inner surface of the casing is maintained at a constant value during the starting phase of the motor and the springs will have an indefinite life.

Obviously many modifications and variations of the present invention are possible in the light of the above teachings. It is, therefore, to be understood that, within the scope of the appended claims, the invention may be practiced otherwise than as specifically described.

I claim:

1. A vane for a rotor of a rotary engine comprising a base, a sealing shoe rockably mounted at one end of said base, said shoe having an inner face directed toward said base and an outer face directed away from said base, the outer face being shaped to conform to a portion of a cylinder, said base having opposite sides, means for mounting a plate on each of said sides for movement in a direction which is toward and away from said shoe and for movement in a direction which is substantially normal to the plate's respective side, each of said plates having an extension forming a tab which extends through the two faces of the sealing shoe, each tab having an end at least a portion of which is complementary with the outer face of the shoe, the tabs and the shoe being beveled with respect to each other so that the shoe can rock with respect to the tabs.

2. In a rotary engine including a rotor eccentrically mounted within a casing, the casing having a cylindrical inner wall between two inner end walls; a device for making a seal with said walls comprising at least one vane slidably supported by said rotor along a radius extending from the central axis of the rotor so that upon rotation of the rotor the vane can move radially with respect to said rotor, said vane having sides adjacent the end walls, each side of the vane being a side plate movable with respect to the remainder of the vane, means for supporting each side plate on the remainder of the vane so that it can move both radially and axially with respect to the rotor, a sealing shoe rockably supported at an outermost end of the vane with respect to the rotor, said shoe extending from one end wall to the other end wall and having ends adjacent the end walls and said shoe having an outer surface which is curved to conform to said cylindrical wall, said shoe further having an opening adjacent each of its ends which extends from its outer face inwardly toward the rotor's axis, each side plate having a tab slidingly engaging a respective end wall so as to form a seal, each tab extending through a respective opening in the shoe and having an outer end which slidingly engages the inner cylindrical wall of the casing and means for biasing each of the side plates radially toward the cylindrical inner wall and axially toward a respective inner end wall whereby wear caused at sliding surfaces of the side plates is taken up so as to maintain an improved seal.

3. A device as claimed in claim 2 wherein the rotor has a pair of said vanes diametrically opposing one another whereby the engine has an improved intake of combustible gases and an improved exhaust of burned gases.

4. A device as claimed in claim 3 wherein at least one spring is disposed within the rotor between the vanes, said spring urging the vanes in substantially a radial direction outward from the rotor axis whereby sealing pressure between the shoe and the cylindrical wall is accurately maintained when the engine is in its starting phase.

5. A rotary engine comprising a casing, a rotor eccentrically mounted within said casing, said casing having a cylindrical wall disposed between two end walls, said rotor having vanes slidingly and radially disposed therein so that upon rotation of said rotor the vanes will engage said cylindrical wall at varying distances from the axis of the rotor, said vanes each having a sealing shoe which is rockably supported at an outermost end thereof with respect to said rotor and which extends from one end wall to the other end wall, each shoe having an outer face which is directed away from said rotor, said outer face being shaped to conform to said cylindrical wall, each vane having side plates, each plate being adjacent a respective end wall and shaped to conform thereto so that the plates are adapted to slidingly engage the respective end wall, means for supporting each plate for movement in a direction which is toward and away from the shoe and in a direction which is substantially normal to a respective end wall, each of said plates having an extension forming a tab which extends through the shoe and slidingly engages the cylindrical wall of the casing and means for biasing each plate toward the cylindrical wall and a respective end wall whereby wear caused at sliding surfaces of each plate is taken up so as to maintain an improved seal.

6. An elongate vane for a rotor of a rotary engine, the engine having a chamber wherein the rotor is eccentrically mounted, said chamber having a cylindrical wall between two end walls, said vane comprising a base portion having an inner end and an outer end with respect the axis of rotation of said rotor, a sealing shoe rockably mounted at the outer end of said base, said shoe having an outer surface with respect to the rotor which is shaped to conform with said cylindrical wall, said base having sides adapted to face said end walls, a flat side plate mounted on each of said base for bidirectional movement, one direction intersecting a respective end wall and the other direction intersecting the cylindrical wall, each side plate having an extension which forms a tab, each tab extending through the sealing shoe and having an outer surface which is complementary with the outer surface of the sealing shoe and means for biasing each of the end plates along their directions of movement whereby wear caused by sliding action of the side plates will be taken up so as to maintain an improved seal.

References Cited in the file of this patent

UNITED STATES PATENTS

| | | |
|---|---|---|
| 280,710 | Baker | July 3, 1883 |
| 453,247 | Smith | June 2, 1891 |
| 553,428 | Rosling | Jan. 21, 1896 |
| 600,951 | McGlenn | Mar. 22, 1898 |
| 771,593 | Welsh | Oct. 4, 1904 |
| 921,802 | Conkey | May 18, 1909 |
| 1,237,768 | Ferguson et al. | Aug. 21, 1917 |
| 1,319,614 | Pierce | Oct. 21, 1919 |
| 1,350,231 | McFarland | Aug. 17, 1920 |
| 1,427,692 | Mahon et al. | Aug. 29, 1922 |
| 1,757,484 | Shoemaker | May 6, 1930 |
| 1,811,729 | Molkenbur | June 23, 1931 |
| 2,075,561 | Wellensiek | Mar. 30, 1937 |
| 2,345,561 | Allen | Apr. 4, 1944 |

FOREIGN PATENTS

| | | |
|---|---|---|
| 149,600 | Great Britain | Aug. 19, 1920 |
| 171,252 | Great Britain | Nov. 17, 1921 |
| 551,263 | France | Jan. 4, 1923 |
| 780,748 | France | Feb. 11, 1935 |